United States Patent [19]
Yoshida

[11] Patent Number: 4,747,074
[45] Date of Patent: May 24, 1988

[54] DISPLAY CONTROLLER FOR DETECTING PREDETERMINED DRAWING COMMAND AMONG A PLURALITY OF DRAWING COMMANDS

[76] Inventor: Shigeaki Yoshida, 3161-77, Irumagawa, Sayama-shi, Saitama, Japan

[21] Appl. No.: 6,963

[22] Filed: Jan. 27, 1987

Related U.S. Application Data

[63] Continuation of Ser. No. 609,439, May 11, 1984, abandoned.

[30] Foreign Application Priority Data

May 13, 1983 [JP] Japan ................................ 58-82618

[51] Int. Cl.⁴ ........................ G06F 15/00; G06F 3/14; G09G 1/14

[52] U.S. Cl. .................................... 364/900; 364/518; 364/521; 340/747

[58] Field of Search ................ 364/200, 900 MS File, 364/518, 521; 340/724, 734, 747, 789; 382/10

[56] References Cited

U.S. PATENT DOCUMENTS 4,100,532 7/1978 Farnbach ................................ 382/1
4,146,925 3/1979 Green et al. ......................... 364/521
4,384,286 5/1983 Di Toro .......................... 364/521 X
4,388,620 6/1983 Sherman ......................... 364/521 X
4,412,296 10/1983 Taylor ................................ 364/521
4,475,237 10/1984 Glasby ............................. 371/67 X
4,479,192 10/1984 Yamagami ...................... 364/521 X
4,509,044 4/1985 Yachida ............................. 340/789
4,536,856 8/1985 Hiroishi ............................. 364/900
4,538,144 8/1985 Yamagami .......................... 340/747
4,703,317 10/1987 Shiomi et al. .................. 340/747 X

FOREIGN PATENT DOCUMENTS 56-35252 4/1981 Japan .................................... 371/19
57-203127 12/1982 Japan .

*Primary Examiner*—Raulfe B. Zache
*Assistant Examiner*—Thomas C. Lee
*Attorney, Agent, or Firm*—Antonelli, Terry & Wands

[57] ABSTRACT

The display controller has a drawing processor for forming an address signal and a data signal to be supplied to a refreshing memory by processing a drawing command supplied thereto, and a digital comparator for comparing an address signal outputted from the drawing processor with an address signal set beforehand. An output of the digital comparator is utilized for referring to the drawing command to be processed. Thus the drawing command which produces a particular one of a plurality of graphic patterns forming a display on a display device can be extracted easily.

9 Claims, 1 Drawing Sheet

DISPLAY CONTROLLER FOR DETECTING PREDETERMINED DRAWING COMMAND AMONG A PLURALITY OF DRAWING COMMANDS

This is a continuation of application Ser. No. 609,439, filed May 11, 1984, now abandoned.

BACKGROUND OF THE INVENTION

This invention relates to a display controller, and is concerned, for example, with an art directed to a display controller for drawing graphic forms on a cathode ray tube display device.

It is conceivable that a display controller may be used for controlling the display of graphic forms on a CRT display device. The display controller comprises a drawing processor having a function almost identical with a microcomputer. The display controller receives a drawing command consisting of a program instruction which relates to a specific graphic form to be drawn. The drawing processor processes the drawing command to form an address signal and data corresponding to the locus of a graphic form to be drawn, namely an address signal and data to be supplied to a refreshing memory for storing an information bit corresponding to a dot assigned on a picture of the CRT display device.

When an arbitrary graphic form is drawn by such a display controller, the graphic form is specified, in most cases, by a combination of a plurality of drawing commands. Accordingly, when the graphic form drawn by the CRT display device is partly corrected, for example, it is necessary to extract the drawing command relating to the particular part.

Now, therefore, the present invention is directed to facilitating implementation and correction of the drawing program by making it possible to detect simply a drawing command which forms a part of the graphic form displayed on the display device under control of the display controller.

SUMMARY OF THE INVENTION

An object of this invention is to provide a display controller having such a function as will facilitate extraction of a specific command for drawing a part of a graphic form from among a command group for drawing graphic forms.

The above and other objects and novel features of this invention will be clarified according to a detailed description and the accompanying drawings.

A typical point of the invention disclosed herein will be summarized as follows: namely, a simplification of the extraction is attained by providing a setting register for storing an address relating to the locus of a graphic form to be drawn by a specific drawing command to be extracted, and a digital comparator for comparing the contents of the setting register with an address signal formed by the above-mentioned drawing processor.

DESCRIPTION OF THE PREFERRED EMBODIMENT

Figure 1:
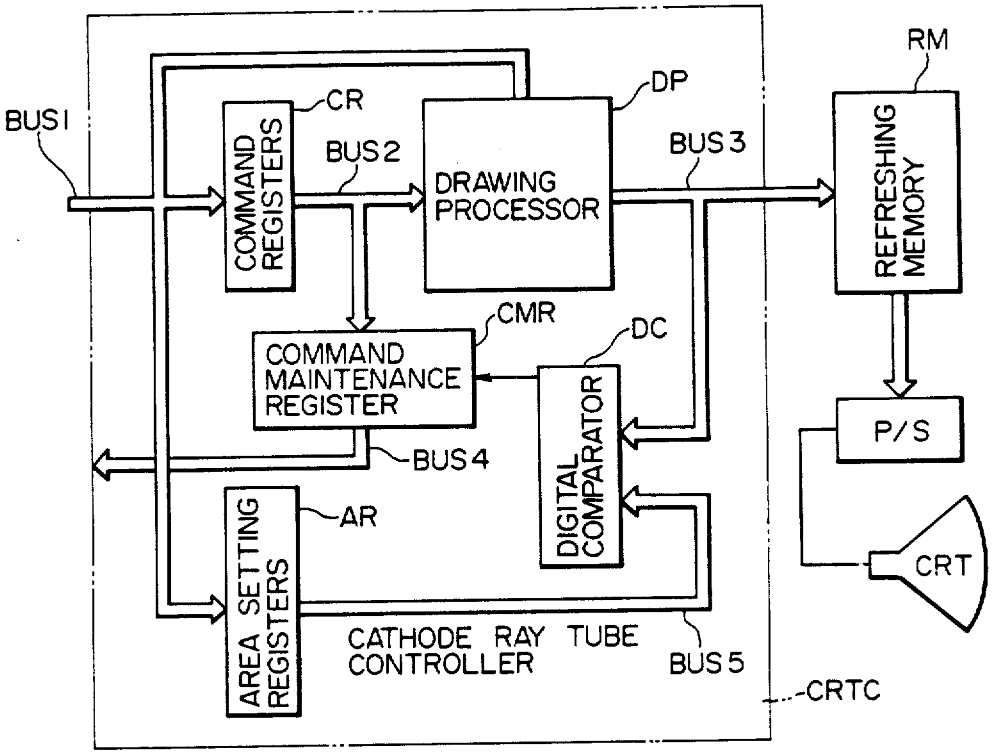
FIG. 1 is a block diagram representing one preferred embodiment of this invention.

A block diagram of one preferred embodiment of this invention is given in FIG. 1.

In FIG. 1, a circuit block surrounded by a dotted line denotes a display controller CRTC relating to this invention. No restrictions are particularly placed thereon, however, the display controller CRTC is formd on one silicon-like semiconductor substrate according to a known technique for manufacturing a semiconductor integrated circuit. The display controller CRTC of this embodiment is constituted of each circuit block described below.

An illustrated bus line BUS1 is connected to a microcomputer system (not illustrated). A drawing command generated from the microcomputer system is supplied to the display controller CRTC through the bus line BUS1.

No restrictions are particularly placed thereon, however, the bus line BUS1 comprises a line through which the drawing command and address data are transmitted and a control line. The address data for indicating an address to be given to various registers in the display controller CRTC and data inputted to various registers are supplied in time division to the bus line BUS1.

A command register CR receives the drawing command formed by a microcomputer system (not illustrated) and the like and transmits the drawing command thus received to a drawing processor DP.

The command register CR, which is not particularly restricated otherwise, comprises a FIFO (first-in first-out) register capable of inputting information of plural bits coming in several words (16 bits each) so as to store a plurality of drawing commands supplied from a microcomputer system (not illustrated). A transfer of information in the drawing register CR is controlled by the drawing processor DP.

Not particularly restricted otherwise, but the drawing command is constituted of a one word drawing command code, and a plural-word parameter field. The drawing command code is given in a bit configuration coordinated with basic patterns to be drawn, for example, a straight line, rectangle, polygon, circle, ellipse, circular arc, elliptic arc, single picture element and the like. No restrictions are particularly placed thereon, however, the embodiment is capable of having a drawing domain set to a picture displayed on the CRT. A data for indicating operation modes such as an operation mode to neglect the drawing domain, an operation mode to allow a drawing in the drawing domain set in the parameter field, an operation mode to stop drawing outside the drawing domain and the like is inputted to the above operand. Various proper data relating to the drawing command code such as, for example, a drawing start address, a drawing stop address, radius data and the like are inputted to the parameter field.

The drawing processor DP has an information processing function equivalent to the function of a microcomputer and processes the above drawing command to form an address signal and data of a refreshing memory RM for storing information bit corresponding to the locus of a graphic form to be drawn. The drawing processor DP then controls data to be outputted from the refreshing memory RM and its output timing.

The drawing processor DP is given in the similar configuration to the microcomputer, and hence no illustration will be made of the configuration in detail, however, it comprises a control circuit including RAM (random access memory), ROM (read only memory) in which programs are written, ALU (arithmetic logic unit), address counter, general purpose register, instruction decoder and timing pulse generator.

Not particularly restricted otherwise, but the refreshing memory RM comprises a RAM (random access memory) provided externally of the display controller, and an address of the information bit and an address of the display dot to be assigned on a picture of the CRT display device are coordinated with each other. An information bit pattern of the refreshing memory and a graphic form consisting of a dot pattern displayed on the CRT display device are thus coordinated with each other.

The CRT display device CRT, which is not particularly restricted, operates to display pictures using a raster scanning system. That is to say, a graphic form is displayed on the CRT according to information bits of the refreshing memory RM being read in sequence synchronously with a raster scan timing of the CRT display device. A parallel/serial conversion circuit converts parallel information consisting of plural bits outputted in parallel from the refreshing memory RM into a serial information stream. Then, the raster scanning display system is itself well known, and hence no further description will be given thereof.

In this embodiment, the following circuit blocks are provided in the display controller CRTC for easy extraction of a specific drawing command.

An area setting register AR holds an address signal on which the locus of a graphic form to be drawn passes. The address signal to be written in the area setting register AR is outputted from a microcomputer system (not illustrated). No particular restrictions are placed otherwise, however, an operation of writing the address signal in the area setting register AR is controlled by the drawing processor DP. When information indicating an address put to the area setting register AR itself is supplied to the bus line BUS1 from a computer system (not illustrated), the area setting register AR is kept ready for inputting according to a control of the drawing processor DP. The address signal supplied to the bus line BUS1 from the microcomputer system thereafter is inputted to the area setting register AR.

No particular restrictions are placed otherwise, however, the address signal set in the area setting register AR is to specify a definite area in this embodiment. An area pattern to be referred on a picture of the CRT display device CRT is specified, for example, as rectangular. The address signal set in the area setting register AR in this case includes a maximum address in the direction X (cross direction of picture) of a rectangular area to be referred to, a maximum address in the direction (longitudinal direction of picture), a minimum address in the direction X and a minimum address in the direction Y.

A digital comparator DC comprises a device for comparing the address signal outputted successively to the refreshing memory RM from the drawing processor DP with the maximum address and the minimum address set in the area setting register AR for dimension. That is to say, the digital comparator DC decides whether or not the address signal outputted from the drawing processor DP comes within the area indicated by an address set in the area setting register AR. The locus of a graphic form passing through the area set as above can be detected by comparing the address information stored in the setting register AR with the address signal formed by the drawing processor DP using the digital comparator DC.

Not particularly restricted otherwise, but a detection signal formed on the digital comparator DC is made to work as a trigger signal of a command maintenance register CMR for storing the drawing command for the graphic form locus. That is to say, contents of the command register CR are stored in the command maintenance register CMR synchronously with the detection timing of the digital comparator DC.

Then, the contents of the command maintenance register CMR are transmitted to an external terminal and sent to the microcomputer side.

Next, an operation for extracting a specific drawing command in the display controller of this embodiment will be described with reference to a graphic form example given in FIG. 2.

Figure 2:
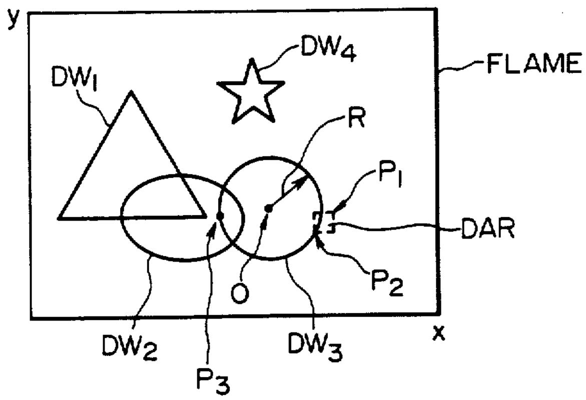
FIG. 2 is an illustration showing one example of a drawing for describing the operation.

In FIG. 2, one graphic form to be displayed on a picture of the CRT display device is constituted of a triangle $DW_1$, an ellipse $DW_2$, a circle $DW_3$ and a star $DW_4$. The illustrated patterns are set by each corresponding drawing command.

For correction of the graphic form drawn by such a plural command group, it is necessary to delete the graphic form to correct the displayed picture. For example, if the drawn circle pattern is to be changed to a circle pattern larger than that, then it is necessary to delete the circle pattern from the displayed picture. In other words, it is necessary to extract and delete a drawing command on which the circle is drawn.

According to this embodiment, an address corresponding to a partial domain of the graphic pattern to be deleted or referred to is set in the area setting register AR. To form the address signal to indicate a domain to be referred to, the microcomputer system is made to have a so-called X-Y tablet. A command for displaying a cursor on a picture of the CRT display device is supplied to the bus line BUS1. The cursor is moved to a desired position by operating a tablet. When the cursor is positioned as desired, a stylus pen of the tablet or a a proper key in the microcomputer system is operated. Thus, the microcomputer system forms an address signal of the area indicated by the cursor.

It is preferable that the address signal set in the area setting register AR be set to a domain where a plurality of graphic patterns are not overlapped each other so as to prevent a plurality of drawing commands from being extracted. Where, for example, a drawing command to the circle pattern $DW_3$ of FIG. 2 is extracted, an area DAR to be referred to is set on a portion relating only to the circle pattern $DW_3$ as illustrated. When a formation of the address signal is indicated by setting of the cursor and the above operation, the microcomputer system forms address signals corresponding to a point $P_1$ of the area DAR where addresses x, y are maximized and a point $P_2$ where addresses x, y are minimized. The address signals are supplied to the area setting register AR through the bus line BUS1.

After desired data is set in the area setting register AR as described, the drawing command will be extracted by executing processing of a drawing command set in the command register CR beforehand.

The drawing processor DP has data to be displayed during a specified period of the display device CRT outputted in sequence from the refreshing memory RM. Not particularly restricted otherwise, but the drawing processor DP outputs data and an address signal therefor which is to be written in the refreshing memory RM in a vertical blanking interval of the display device to a bus line BUS3.

A data formed according to one drawing command and an address signal therefor will be given as follows:

In case, for example, the drawing command indicates a circle pattern having a center O and radius R, a display dot and an address positioned on the locus of a circle are obtained successively through arithmetic operation. In the case of FIG. 2, for example, a display dot $P_3$ on the circular locus is set first. Then, display dots positioned clockwise on the circular locus are set successively.

The digital comparator DC compares the contents (address information of a domain P) of the area setting register AR with address information outputted successively from the drawing procesor DP. When an address signal for drawing the locus passing the domain P is detected, the digital comparator DC outputs a trigger signal for storing the drawing command responsible for drawing the locus (graphic form) in the command maintenance register CMR. The command maintenance register CMR then stores the drawing command for drawing the graphic form automatically. Not particularly restricted otherwise, but when the command for drawing the whole graphic form has been executed, the contents of the command maintenance register MR, namely the extracted command are fetched by the microcomputer system through a bus line BUS4.

According to this invention described along with the embodiment as above, the following effects will be obtainable.

(1) A specific drawing command can be fetched automatically from among a plurality of drawing commands according to a simple method wherein the address domain through which the locus of a graphic form passes is specified by the registers AR, CMR and the digital comparator DC.

(2) A software for extracting the specific drawing command can be formed simply according to (1) above.

(3) Since a drawing command to extract is obtainable automatically through a simple information processing of a series operation for drawing graphic forms according to (1) and (2) above, the processing time can be shortened.

(4) A display controller having a function of extracting the specific drawing command is constituted of a one-chip semiconductor integrated circuit, thereby attaining simplification and low cost in a microcomputer system having a graphic drawing function.

The invention has been described as above with reference to its one preferred embodiment, however, it goes without saying that the invention is not limited to the specific embodiment thereof, and various changes and modifications may be made in the invention without departing from the spirit and scope thereof. For example, the command maintenance register CMR may be omitted, and a detection output of the digital comparator DC may be sent out directly as a detection output to the microcomputer system in the form of an interrupt request signal. In this case, the microcomputer system detects the drawing command under execution through interruption handling. Thus, the method for detecting drawing commands on the basis of the detection output of the digital comparator DC may employ various modes of operation. Then, the address information inputted to the setting register for extraction of the specific drawing command may be given in an address information to specify the above domain or in that of specifying dots or lines otherwise.

Further, the registers AR, CMR and the digital comparator DC will be constituted of a separate chip semiconductor integrated circuit, which can be used in combination with an existing display controller with the drawing processor DP incorporated therein.

The above description refers to the case where the invention made by the inventor is applied substantially to the display controller using a CRT display device coming in a technical field of the background therefor, however, it is not necessarily limited only thereto, but can be applied likewise to the case where other types of display device, such as a liquid crystal display in dot configuration, is used for the display device.

I claim:

1. A display controller for a system having a microcomputer for generating drawing commands, a refresh memory for storing image data and a display device connected to said refresh memory for displaying said image data, said display controller comprising:

a drawing processor including a random access memory, a read only memory, an arithmetic logic unit, a register and a command decoder, said drawing processor being responsive to receipt of a plurality of drawing commands from said microcomputer for generating address signals and data signals representing image data by processing each drawing command supplied thereto and for supplying said address signals and data signals to said refresh memory, so that images are displayed on a display device on the basis of the data stored in said refresh memory; and a digital comparator connected to said drawing processor for comparing an address signal outputted from the drawing processor with a predetermined address signal which uniquely identifies at least a portion of a single selected image corresponding to one of said plurality of drawing commands and for producing an output signal when comparison is detected; and means responsive to said output signal of the digital comparator for detecting a single particular drawing command among said plurality of drawing commands processed by said drawing processor and for supplying an output to said microcomputer indicating the detected drawing command.

2. The display controller as defined in claim 1, wherein said predetermined address signal which is supplied to the digital comparator comprises a plurality of address signals indicating a predetermined area of the image to be formed on the display device.

3. The display controller as defined in claim 2, wherein said detecting means comprises a register connected to receive said drawing commands being supplied to said drawing processor, the output signal of the digital comparator being supplied to said register to cause a drawing command to be stored therein.

4. The display controller as defined in claim 3, comprising a one-chip monolithic semiconductor integrated circuit.

5. The display controller as defined in claim 2, comprising a one-chip monolithic semiconductor integrated circuit.

6. A display controller responsive to the receipt of a sequence of drawing commands from a drawing command generating device for storing display data in a refresh memory so that images corresponding to said drawing commands are displayed on a display device, said display controller comprising:

a drawing processor including a random access memory, a read only memory, an arithmetic logic unit, a register and a command decoder, said drawing processor being responsive to receipt of said sequentially supplied drawing commands for generating address signals and data signals by processing each drawing command supplied thereto and for supplying said address signals and data signals to said refresh memory;

means for providing an address signal which uniquely identifies at least a portion of a single selected image corresponding to one of said sequentially received drawing commands;

a digital comparator connected to said drawing processor and said address signal providing means for comparing each address signal outputted from said drawing processor with the address signal from said address signal providing means so as to produce an output signal indicating the processing by said drawing processor of the drawing command corresponding to said single selected image when comparison is detected; and command identifying means responsive to the output signal from said digital comparator for supplying to said drawing command generating device a signal which identifies the drawing command corresponding to said single selected image.

7. A display controller as defined in claim 6, comprising a one-chip monolithic semiconductor integrated circuit.

8. A display controller as defined in claim 6, wherein said address signal providing means stores a plurality of address signals, including maximum and minimum addresses defining an area including a portion of the selected image but no other image to be formed on said display device.

9. The display controller as defined in claim 6, wherein said command identifying means includes a register connected to receive said drawing commands being supplied to said drawing processor, the output signal of the digital comparator being supplied to said register to cause a drawing command to be stored therein.

* * * * *